United States Patent
Wood (10) Patent No.: US 7,321,210 B2
(45) Date of Patent: Jan. 22, 2008

(54) SENSORLESS BRUSHLESS DIRECT CURRENT MOTOR DRIVE USING PULSE WIDTH MODULATION SPEED CONTROL AT MOTOR FREQUENCY

(75) Inventor: Peter N Wood, Rolling Hills Estates, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/396,758

(22) Filed: Apr. 3, 2006

(65) Prior Publication Data
US 2006/0222345 A1    Oct. 5, 2006

Related U.S. Application Data

(60) Provisional application No. 60/668,897, filed on Apr. 5, 2005.

(51) Int. Cl.
    *H02P 1/18*    (2006.01)
(52) U.S. Cl. ................ 318/254; 318/138; 318/439; 318/599
(58) Field of Classification Search ........... 318/254, 318/138, 459, 599, 500
    See application file for complete search history.

(56) References Cited

U.S. PATENT DOCUMENTS

| | | | | |
|---|---|---|---|---|
| 4,631,458 A | * | 12/1986 | Furuichi | 318/254 |
| 5,289,097 A | * | 2/1994 | Erickson et al. | 318/561 |
| 5,689,162 A | * | 11/1997 | Li | 318/599 |
| 5,731,670 A | * | 3/1998 | Galbiati et al. | 318/254 |
| 6,034,494 A | * | 3/2000 | Kitamine et al. | 318/254 |
| 6,337,548 B2 | * | 1/2002 | Kawabata et al. | 318/439 |
| 6,903,523 B2 | * | 6/2005 | Peterson | 318/138 |
| 2005/0029976 A1 | | 2/2005 | Terry | |

FOREIGN PATENT DOCUMENTS

| | | |
|---|---|---|
| EP | 0 698 769 A | 2/1996 |
| JP | 04 322173 A | 11/1992 |

* cited by examiner

*Primary Examiner*—Rina Duda
(74) *Attorney, Agent, or Firm*—Ostrolenk, Faber, Gerb & Soffen, LLP (57) ABSTRACT

Disclosed is a variable speed brushless direct current (BLDC) motor drive circuit. The circuit includes a plurality of high-side and low-side controlled switches coupled in a three-phase bridge configuration for commutating a BLDC motor, each phase of the bridge being connected to a corresponding phase of the motor, a controller for providing a drive signal to drive each of the high-side and low-side switches, and a speed control loop for controlling the motor by PWM of a DC bus voltage to achieve a constant motor speed. The speed control loop includes a pulse circuit receiving the drive signals provided from the controller for controlling the high-side switches and for providing a pulse signal that is related to a desired motor speed, a plurality of high-side drivers for driving the high-side switches, each high-side switch being coupled to a respective high-side driver, and a plurality of gating circuits each receiving the pulse signal from the pulse circuit and a drive signal for a respective high-side controller from the controller for generating a pulse width modulation (PWM) control signal having a pulse duration determined by said pulse signal from said pulse circuit to thereby drive each of the high-side drivers to modulate their corresponding high-side switches.

22 Claims, 10 Drawing Sheets

SENSORLESS BRUSHLESS DIRECT CURRENT MOTOR DRIVE USING PULSE WIDTH MODULATION SPEED CONTROL AT MOTOR FREQUENCY

CROSS-REFERENCE TO RELATED APPLICATION

This application is based on and claims benefit of U.S. Provisional Application Ser. No. 60/668,897, filed on Apr. 5, 2005, entitled SENSORLESS BRUSHLESS DC MOTOR DRIVE USING PULSE WIDTH MODULATION SPEED CONTROL AT MOTOR FREQUENCY, to which a claim of priority is hereby made and the disclosure of which is incorporated by reference.

FIELD OF THE INVENTION

The present invention relates to brushless direct current (BLDC) motor drives, and more particularly, to minimizing switch losses in three-phase pulse width modulation (PWM) BLDC motor drives.

BACKGROUND OF THE INVENTION

Typically, two distinct types of drives, six-step trapezoidal drives and PWM drives, are used to drive multi-phase BLDC motors. In the six step trapezoidal drives, speed regulation is obtained by controlling a direct current (DC) supply voltage with a pre-regulator operating at a high frequency. In the PWM drives, the speed regulation is obtained by controlling a volt-seconds alternating current (AC) output. That is achieved by PWM of a DC supply voltage at a high frequency.

Several types of the six step brushless drives are commercially available. These drives are typified by a TDA5142T integrated circuit (IC) 10 from Philips Semiconductors shown in a BLDC motor drive circuit of FIG. 1. These ICs 10 directly drive the power insulated gate bipolar transistors (IGBTs) 14 connected to the BLDC motor 12.

Both types of drives, the six-step trapezoidal drives and the PWM drives, require power IGBTs capable of operating at high frequencies and, therefore, both types of drives have significant switch efficiency losses.

It is therefore an object of the present invention to provide a three-phase PWM BLDC motor drive circuit that minimizes switch efficiency losses of the IGBTs or other types of transistors operating at high frequencies.

SUMMARY OF THE INVENTION

A BLDC drive circuit of the present invention combines the best features of the six-step trapezoidal drives and the PWM drives. Thus, the features of the BLDC drive circuit of the present invention include (a) a very low switch conduction loss of the six step drives and (b) a PWM of an AC output without the need for high frequency IGBT switches. Moreover, these features enable the inventive BLDC drive circuit to use standard speed IGBTs that have lower conduction losses and low switch efficiency losses when operated at motor frequency. Additionally, the BLDC drive circuit of the present invention maximizes the resulting overall drive efficiency.

A sensorless commutation control operates through detection of zero crossings of a back electromotive force (EMF) in the non-energized motor winding. These conditions generate the timing pulses for optimum commutation of the motor. During a start-up period, when there is no generated back EMF, drive outputs are clocked by a frequency ramp-up until back EMF is established.

Instead of driving the IGBTs directly, the inventive BLDC drive circuit outputs trigger a delay that causes the IGBTs to conduct electricity for a reduced time at each commutation of the motor. By reducing the IGBTs' conduction time, the BLDC drive circuit effectively reduces the volt-seconds output and thus, controls the motor speed.

The volt-seconds control can be performed in open loop systems, where output from an analog control voltage source is controlled. Alternatively, the volt-seconds control can be performed in closed loop systems, where a motor speed can be regulated against electrical line and load variations.

A variable speed BLDC motor drive circuit of the present invention includes a plurality of high-side and low-side switches, e.g., insulated gate bipolar transistors (IGBTs) coupled in a three-phase bridge configuration for commutating a BLDC motor, each phase of the bridge being connected to a corresponding phase of the motor. The circuit also includes a controller for providing a signal for each of the high-side and low-side IGBTs, the signals being provided in response to detection of zero crossings of a back electromotive force (EMF) corresponding to outputs of each of the bridge phases corresponding to a non-energized motor winding.

Furthermore, the circuit includes a speed control loop for controlling the motor by pulse width modulation (PWM) of a DC bus voltage to achieve a constant motor speed. The speed control loop includes a pulse circuit, e.g., dual monostable multivibrator receiving a leading edge of the signals provided from the controller to the high-side IGBTs; a plurality of high-side drivers for controlling the high-side IGBTs, each high-side IGBT being coupled to a respective high-side driver, and a plurality of gating circuits receiving a pulse from the multivibrator and the signal to the high-side IGBTs from the controller and providing PWM signals to each of the high-side drivers that modulate their corresponding high-side IGBTs.

Other features and advantages of the present invention will become apparent from the following description of the invention that refers to the accompanying drawings.

DETAILED DESCRIPTION OF EMBODIMENTS OF THE INVENTION

Figure 1:
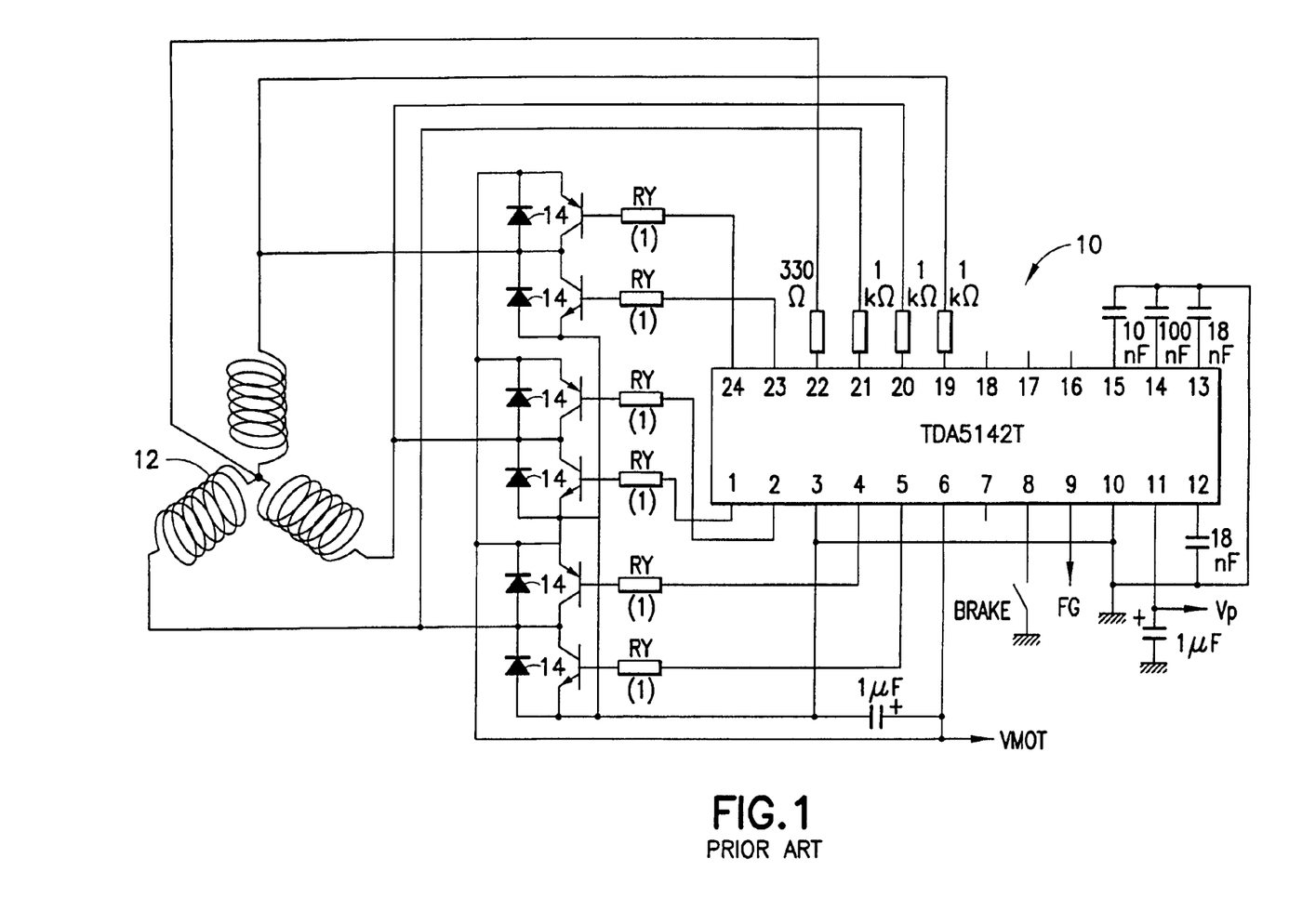
FIG. 1 is a schematic circuit diagram of a prior art BLDC motor drive circuit utilizing TDA5142T IC.

FIG. 1 illustrates a typical three-phase 300-Watt brushless direct current (BLDC) motor drive integrated circuit (IC) 10 used for various applications, including refrigeration. A microprocessor or digital signal processor (DSP) may be used to generate pulse width modulation (PWM) of the output signals at pins 1, 2, 4, 5, 23, and 24 of the BLDC motor drive IC 10. These PWM signals are used to drive power insulated gate bipolar transistors (IGBTs) 14, which provide power for starting and running a motor 12. The PWM frequency for such three-phase BLDC motor drive ICs 10 is chosen as a compromise between the need for minimum waveform distortion and minimum electromagnetic interference/radio frequency interference (EMI/RFI) generation and usually lies somewhere between 4 KHz and 16 KHz.

Six-step drives, on the other hand, operate motors at frequencies which are usually in the range of 40 to 300 Hz and speed regulation is achieved by direct current (DC) bus voltage control which necessitates additional Metal-Oxide Semiconductor gated switches.

Figure 2:
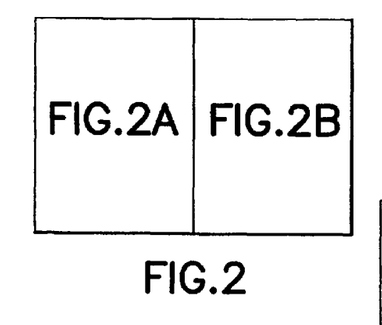
FIG. 2 is a schematic circuit diagram of a BLDC motor drive circuit of the present invention.
Figure 2A:
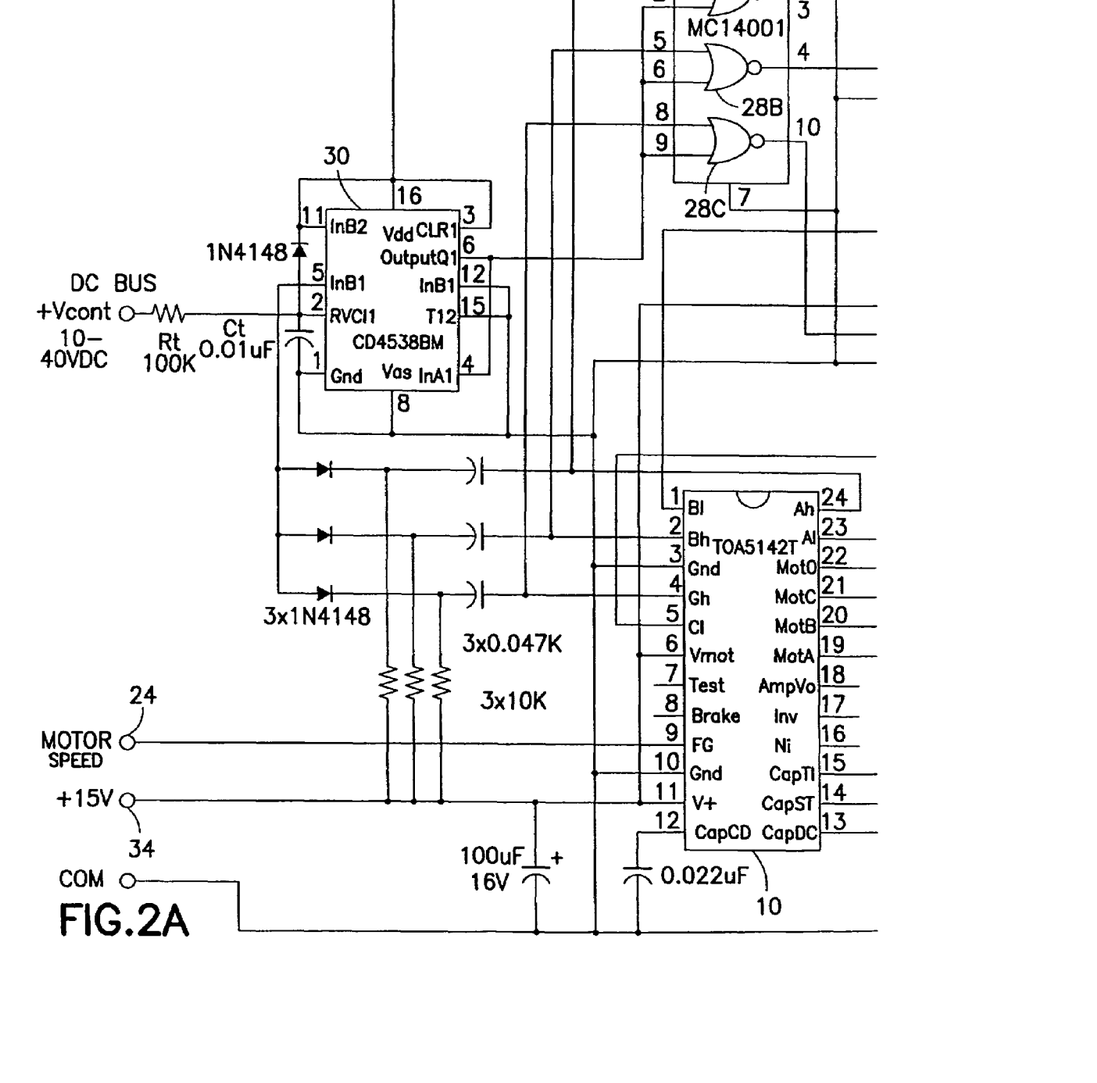
Figure 2B:
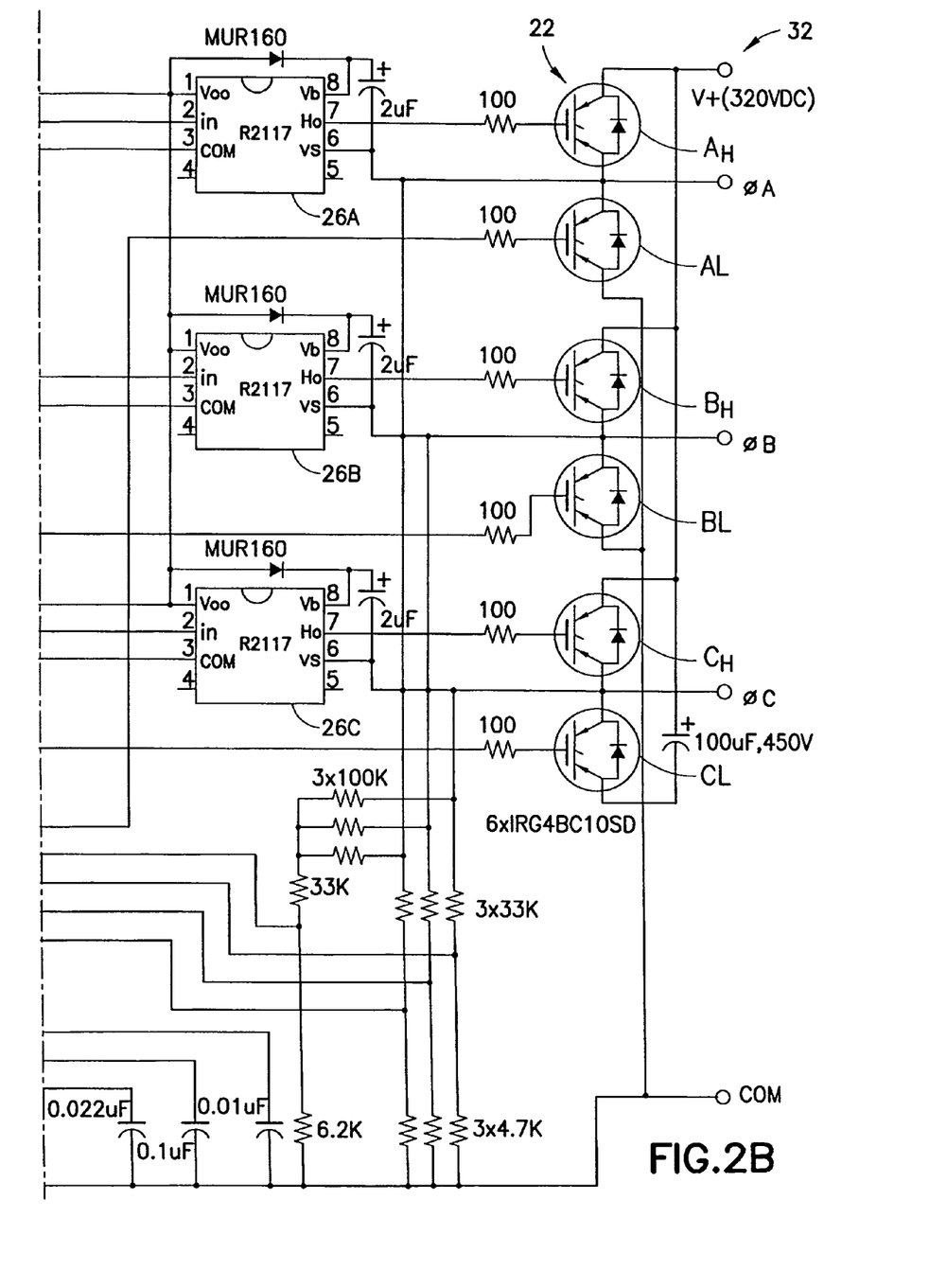

FIG. 2 shows a BLDC motor control circuit 20 of the present invention. The control circuit 20 combines the best attributes of both the three phase PWM BLDC motor drive, such as that shown in FIG. 1, and the six-step drive. The inventive control circuit 20 is a six-step drive which uses PWM at motor frequencies, thus almost eliminating the switching power loss of IGBTs' and maximizing overall efficiency of the three phase BLDC motor drive control circuit 20 without the use of a micro controller.

The present invention uses a three phase, 15-Volt, BLDC motor drive IC 10 designed to drive low voltage metal-oxide semiconductor field-effect transistors (MOSFETs) or IGBT's. For example, Philips TDA 5142T, described above with reference to FIG. 1, may be used as the BLDC motor drive IC 10. Output signals for driving three low-side N-Channel devices $A_L$, $B_L$, and $C_L$ are provided from pins 1, 5, and 23 of the IC 10. Output signals for driving three high-side P-Channel devices $A_H$, $B_H$, and $C_H$ are provided from pins 2, 4, and 24 of the IC 10. The low and high side devices A, B, and C, for example, IGBTs with ultrafast soft recovery diode IRG4BC20SD from International Rectifier Corporation, are coupled in a three-phase bridge configuration 22.

The BLDC motor drive IC 10 provides initial rotor positioning and acceleration control for starting of a BLDC motor (not shown) connected to the three-phase bridge 22 at phases ØA, ØB, and ØC. The motor is then controlled by a speed control loop modulating the DC bus voltage to achieve constant speed. Starting ramp-up dfreq/dt is selected by an external capacitor until the motor generates back EMF that is then detected at comparator input pins 19, 20, and 21 of the IC 10 corresponding to phases A, B, and C respectively and used to optimally commutate the motor.

Commutation times are determined by zero crossings of the back EMF of the non-energized motor winding. In a normal operation, one of the three phases ØA, ØB, and ØC is connected to the positive bus, another is connected to the negative bus, and the third is an open circuit that can be used to sense the zero crossing.

As described above, the three low-side output signals from pins 1, 5, and 23, directly drive the low-side 600V IGBTs $A_L$, $B_L$, and $C_L$. Each of the three high-side output signals from pins 2, 4, and 24 is processed in a corresponding two input NOR gate 28A, 28B, or 28C. The output from the NOR gates is delivered to the three corresponding high-side drivers 26A, 26B, and 26C, for example IR2117 ICs from International Rectifier Corporation.

The second input for the NOR gates 28A, 28B, and 28C is provided from a dual monostable multivibrator IC 30, for example CD4538 ICs from Fairchild Semiconductor Corporation. Operation of the IC 30 is triggered by the leading edge of each of the three high-side signals from pins 2, 4, and 24 of the BLDC motor drive IC 10. The timing circuit of the IC 30 is controlled by an external DC voltage and a timing capacitor. The output pulses of the IC 30, at three times the motor frequency, is applied to the second input of the NOR gates 28A, 28B, and 28C. The NOR-gates generate the required PWM input signals that modulate the three high-side IGBTs $A_H$, $B_H$, and $C_H$ via the high-side drivers 26A, 26B, and 26C. The PWM input signal is then delayed by the pulse from the pulse circuit 30, thus pulse width modulating the signal provided to the gates of the high side switches at the motor frequency.

Figure 3A:
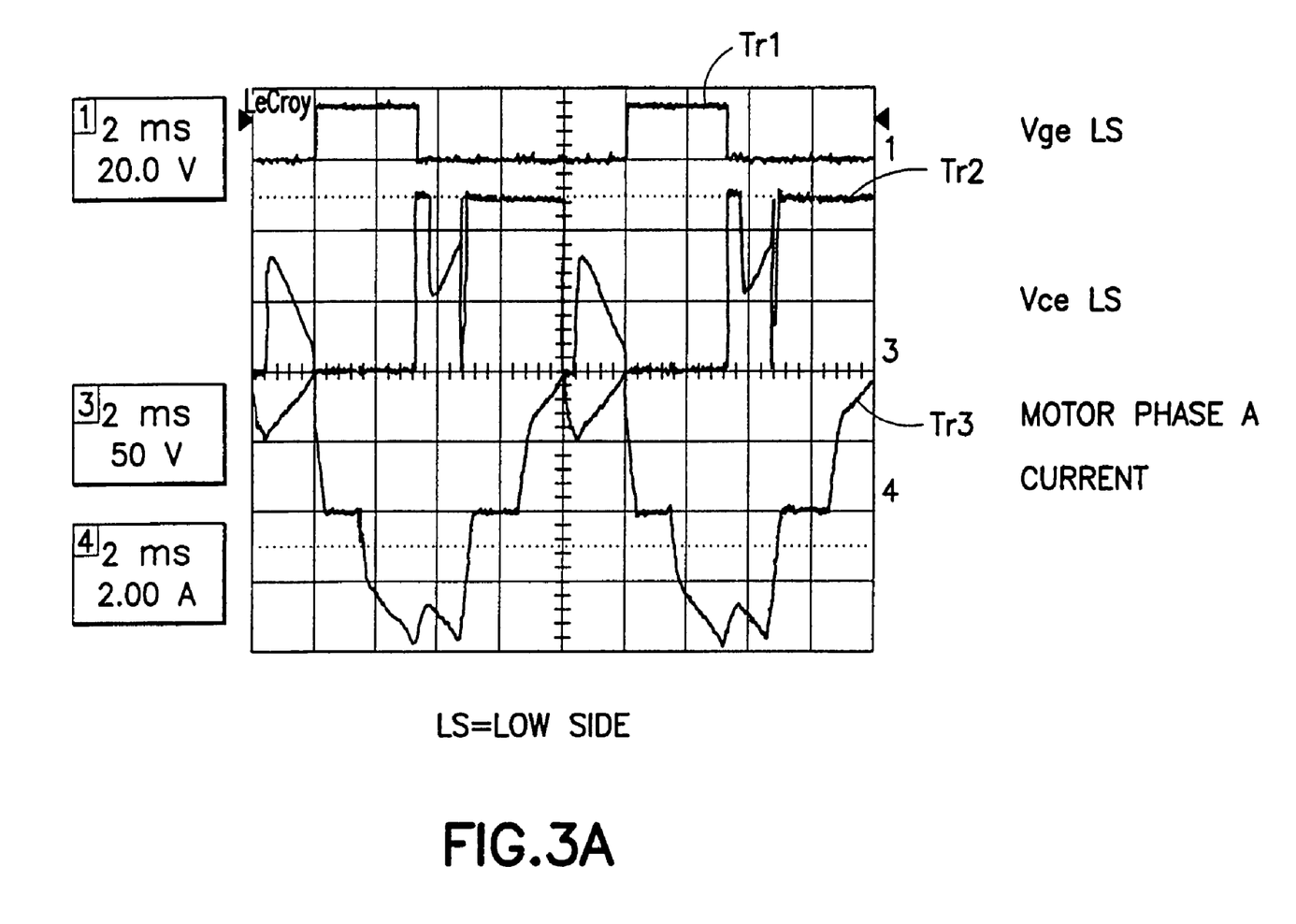
FIGS. 3A, 3B, and 3C each show (6 step waveform) waveforms of Vge of Phase A low side IGBT, Vce Phase A low side IGBT, and motor Phase A current, at respectively, minimum, medium, and high modulation.
Figure 3B:
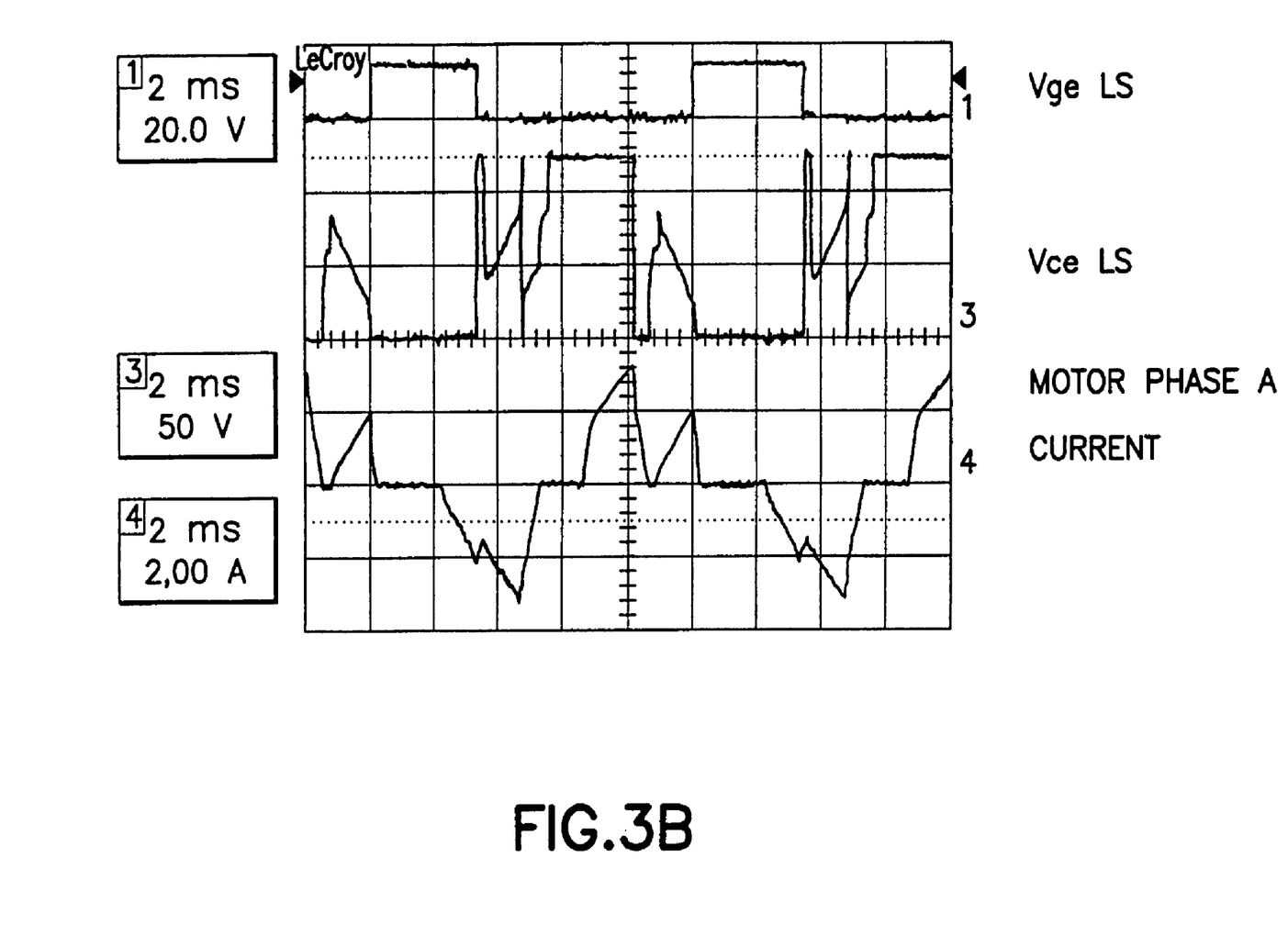
Figure 3C:
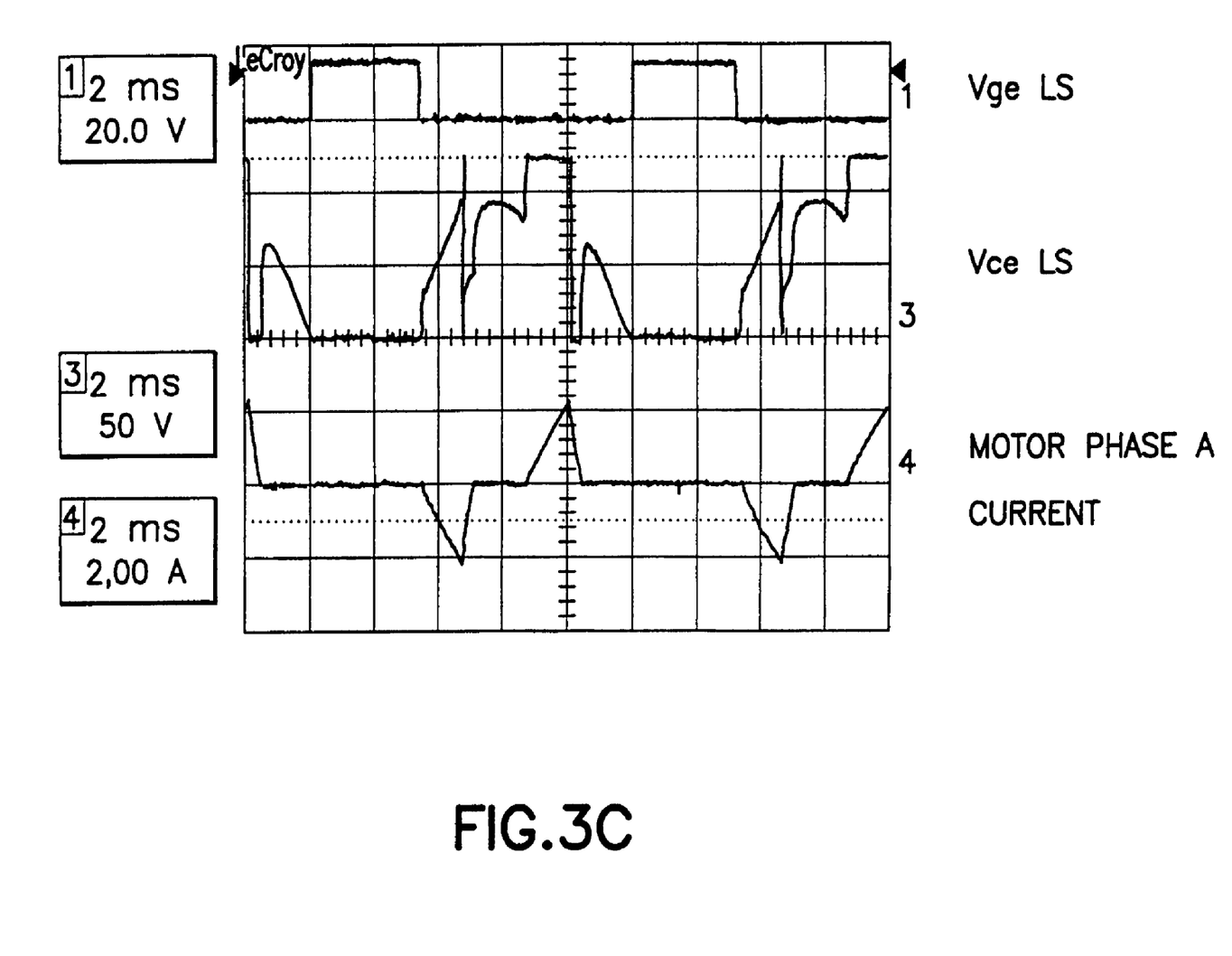

FIGS. 3A, 3B, and 3C illustrate the waveforms of the PWM used to control the motor power. The waveforms of a phase voltage and current were taken at a minimum modulation (high power), medium modulation, and near a maximum modulation, i.e., minimum power input. In FIGS. 3A, 3B, and 3C, a trace Tr1 represents a Vge voltage of phase A low-side IGBT at 20V/div; a trace Tr2 represents a Vce voltage phase A low-side IGBT at 50V/div; and a trace Tr3 representing a motor phase A current at 2 A/div.

FIG. 3C illustrates a 56 Watts, 50 Hz, 3000 RPM 6-step waveform with a minimum modulation. FIG. 3B illustrates a 160 Watts, 50 Hz, 3000 RPM 6-step waveform with a medium modulation. Finally, FIG. 3A illustrates a 300 Watts, 50 Hz, 3000 RPM 6-step waveform with a high modulation. FIGS. 3A, 3B, and 3C clearly show a progressive PWM motor frequency modulation to control motor power.

Returning to FIG. 2, the current flow through each motor winding is obtained instantaneously via the two conducting phases A, B, or C of the three-phase bridge, which are in different stages of operation, the third phase being an open circuit used to detect zero voltage crossings for a phase commutation. The three low-side IGBTs $A_L$, $B_L$, and $C_L$ are driven to the normal 120° conduction angles, but a phase current can flow only when the corresponding high-side IGBT, i.e., $A_H$, $B_H$, or $C_H$, is in conduction and it is this corresponding high-side IGBT that is modulated by the reduced pulse width, typically 45° to 105° at 3000 RPM and proportionately more at lower speeds.

At very low speeds, the limitation would likely be an excessive torque ripple. However, for compressor loads, where very low speed operation is not required, this limitation will not cause a problem. A typical refrigeration/air-conditioning compressor operates at a speed ratio of about 3:1, e.g., 50 to 150 Hz or 1000 to 3000 RPM for a six pole motor.

Figure 4A:
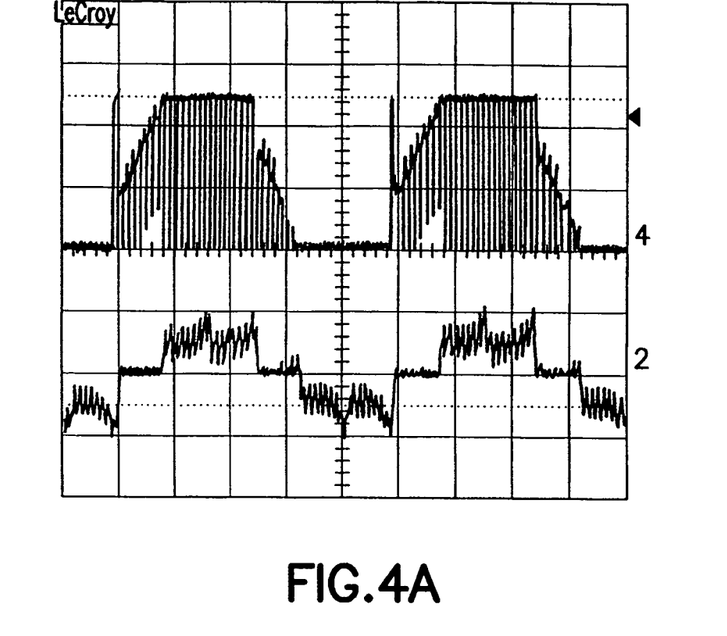
FIGS. 4A and 4B are graphs showing a 5 KHz microprocessor controlled PWM voltage and current waveforms for 60-Watt and 300-Watt units respectively.
Figure 4B:
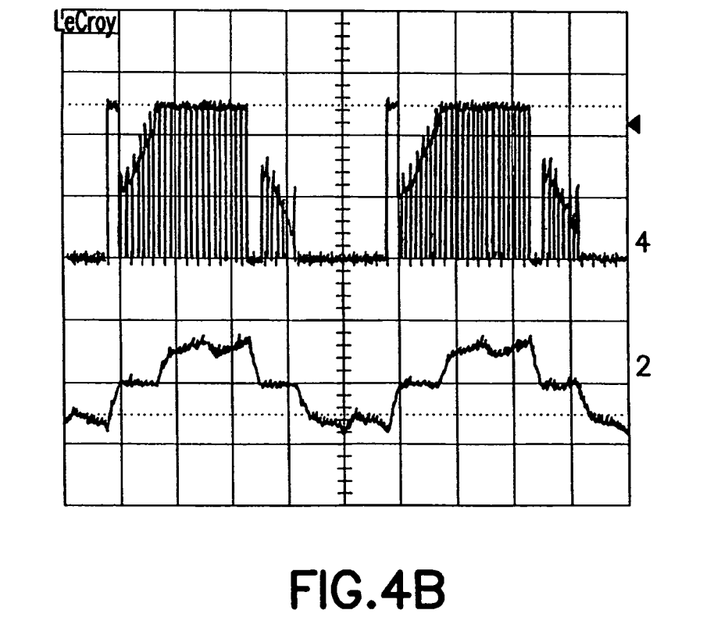

For comparison, FIG. 4A shows 60-Watt, 5 KHz, microprocessor controlled PWM voltage and current waveforms and FIG. 4B shows 300-Watt, 5 KHz microprocessor controlled PWM voltage and current waveforms.

Tests of the circuit 20, to evaluate the present invention were conducted. For these tests, as discussed above, the power for the IGBTs 22 was supplied from a DC power supply 32 and auxiliary power of 15V and 9 mA (0.135 W) was supplied from a second supply 34. A BLDC motor (not shown) was connected to the phases ØA, ØB, ØC via a digital multiphase wattmeter, e.g., Yokogawa WT1600. The motor was loaded by a separately excited DC generator. The field current of that DC generator was adjusted to control power from IGBTs 22 from 56 W to 300 W.

Throughout the first test, frequency of the BLDC motor was maintained at 100 Hz (4 pole, 3000 RPM). The results of the above described test, shown in Table 1, indicate efficiency variation with a load current. These results further represent typical IGBT conduction losses where switch losses are small and constant.

TABLE 1

| Motor Frequency | DC Bus Voltage | DC Input Power | AC Motor Power | Total IGBT Power Losses | Efficiency |
|---|---|---|---|---|---|
| 99.97 Hz | 122.32 V | 57 W | 55.8 W | 1.24 W | 97.83% |
| 100.16 | 122.30 | 63 | 61.3 | 1.46 | 97.7 |
| 100.09 | 122.19 | 82 | 80.7 | 1.78 | 97.8 |
| 100.09 | 122.06 | 103 | 100.8 | 2.31 | 97.8 |
| 99.83 | 122.02 | 120 | 117.1 | 2.75 | 97.7 |
| 100.30 | 121.99 | 140 | 136.3 | 3.19 | 97.7 |
| 100.12 | 121.94 | 161 | 157.2 | 3.47 | 97.8 |
| 100.17 | 121.9 | 179 | 175.0 | 3.83 | 97.9 |
| 100.74 | 121.85 | 200 | 196.0 | 4.43 | 97.8 |
| 99.56 | 121.17 | 220 | 215.4 | 4.90 | 97.8 |
| 100.35 | 121.76 | 245 | 239.7 | 5.71 | 97.7 |
| 100.46 | 121.74 | 259 | 253.0 | 6.10 | 97.7 |
| 100.26 | 121.45 | 307 | 300.4 | 6.53 | 97.9 |

Figure 5A:
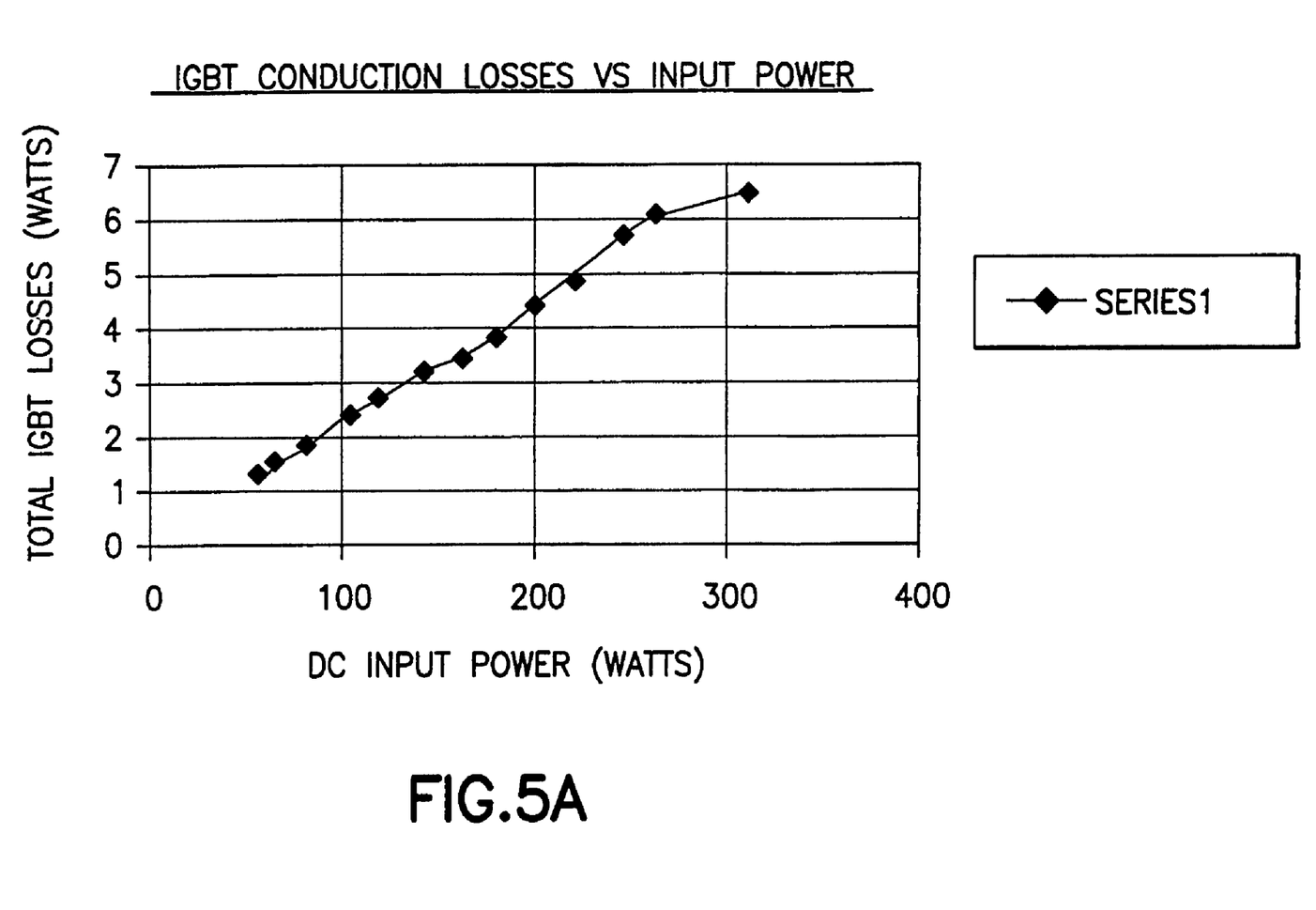
FIG. 5A is a graph illustrating IGBT conduction losses as measured against input power using values from Table 1.

FIG. 5A shows a graph of the IGBT conduction switching loss values, recorded in Table 1, as a function of the corresponding DC input power values that are also recorded in Table 1. The graph shows that the represented IGBT conduction losses are fairly small and constant. It also shows that the overall efficiency of the circuit 20 remains essentially constant at 97.8% throughout the DC power input range of 55 to 307 Watts.

Table 2 shows results of another test, in which a motor load is proportional to a motor speed, a field excitation of the DC generator load was maintained constant. Thus a torque was directly proportional to the motor DC input power and inversely proportional to revolutions per minute (RPM). This test simulated an actual compressor operation in an air conditioning system with approximately a 2:1 input power range.

TABLE 2

| Motor Frequency | DC Bus Voltage | DC Input Power | AC Motor Power | Total IGBT Power Losses | Efficiency |
|---|---|---|---|---|---|
| 52.93 Hz | 85.83 V | 116 W | 111.8 W | 4.37 W | 96.24% |
| 63.19 | 92.62 | 151 | 145.7 | 5.02 | 96.67 |
| 77.32 | 111.20 | 206 | 200.1 | 5.90 | 97.14 |
| 87.73 | 120.9 | 251 | 244.8 | 6.52 | 97.41 |
| 99.40 | 121.64 | 302 | 294.9 | 7.07 | 97.66 |

Figure 5B:
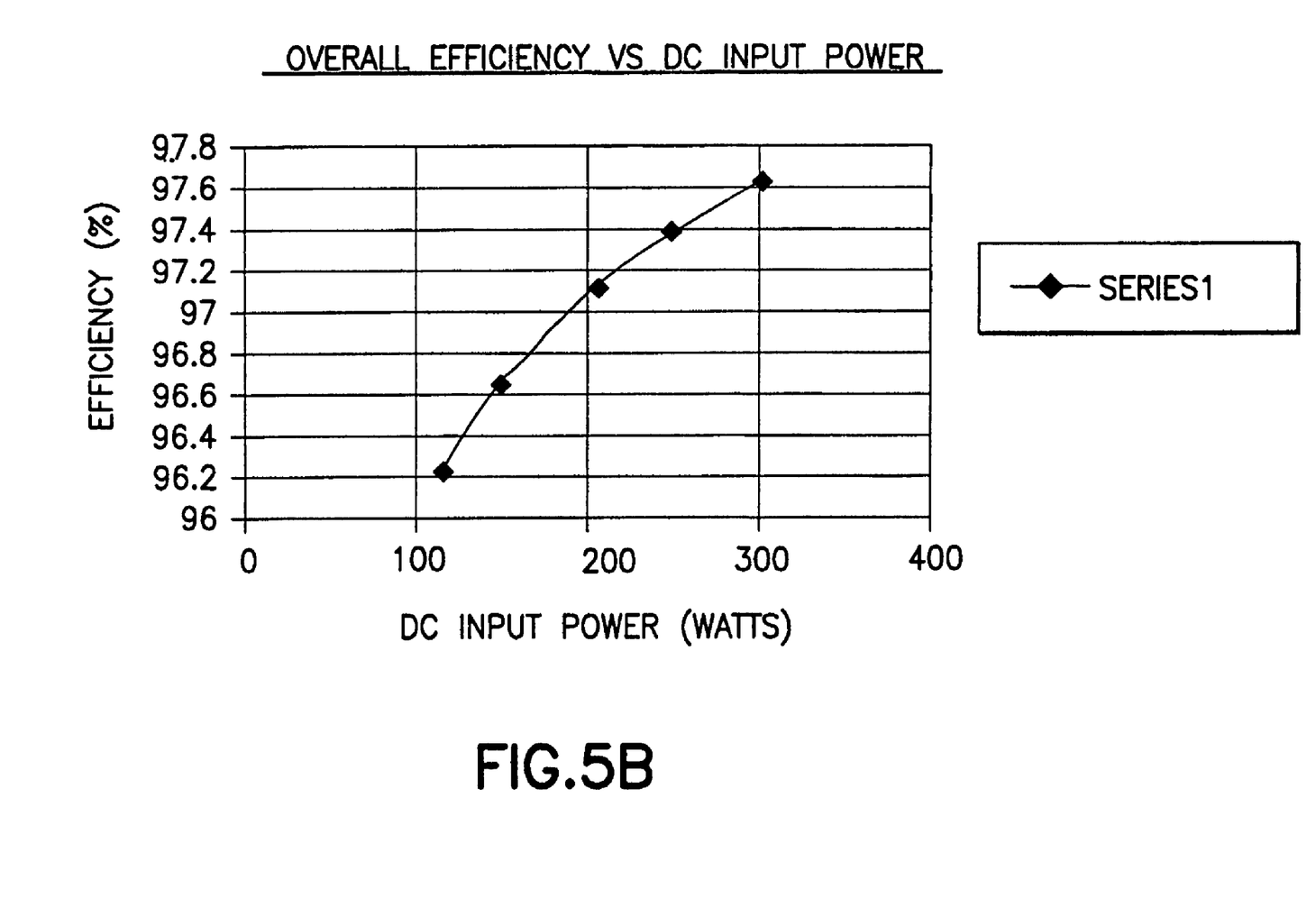
FIG. 5B is a graph illustrating efficiency as a function of motor speed and input power as shown in Table 2.

FIG. 5B shows a graph of values representing the overall efficiency of the IGBTs or the speed of the motor from 52.93 Hz (1588 RPM) to 99.4 Hz (2982 RPM) as listed in Table 2, as a function of the DC input power from 116 W to 302 W also recorded in Table 2.

In a third test, performed as a reference comparison to the above two evaluations, a 300 W, 5 KHz, micro controller driven BLDC drive 10 (as in FIG. 1) was performed. Conditions of the third test closely matched these of the circuit 20 tests. The same sensorless BLDC motor and IGBTs were used at a speed of 100 Hz (3000 RPM) and a DC bus voltage of 121 VDC. The results of the test are listed in Table 3.

TABLE 3

| Motor Frequency | DC Bus Voltage | DC Input Power | AC Motor Power | Total IGBT Power Losses | Efficiency |
|---|---|---|---|---|---|
| 100.1 Hz | 121.86 V | 60 W | 57.3 W | 2.76 W | 95.41% |
| 100.5 | 121.83 | 100 | 95.8 | 3.91 | 96.08 |
| 100.45 | 121.80 | 140 | 135.0 | 5.13 | 96.34 |
| 100.19 | 121.79 | 180 | 173.2 | 6.44 | 94.42 |
| 100.4 | 121.57 | 220 | 212.1 | 7.78 | 96.46 |
| 100.37 | 121.45 | 260 | 250.6 | 9.39 | 96.39 |
| 100.14 | 121.42 | 300 | 288.7 | 10.90 | 96.36 |

The superior performance of the motor frequency PWM circuit of the present invention can be clearly seen from the comparison of the results recorded in Table 1 and the results in Table 3. The reduction of IGBT conduction losses provided by the inventive circuit 20 of the invention, results in an efficiency gain of 97.7% vs. 95.4% at 60 Watts and 97.9% vs. 96.36% at 300 Watts. Moreover, the present invention eliminates the need for a heat sink when using IGBTs, e.g., International Rectifier TO-220 100V power MOSFET. In a three-phase module a heat sink would still be used due to the smaller package size and resulting higher power density.

Figure 5C:
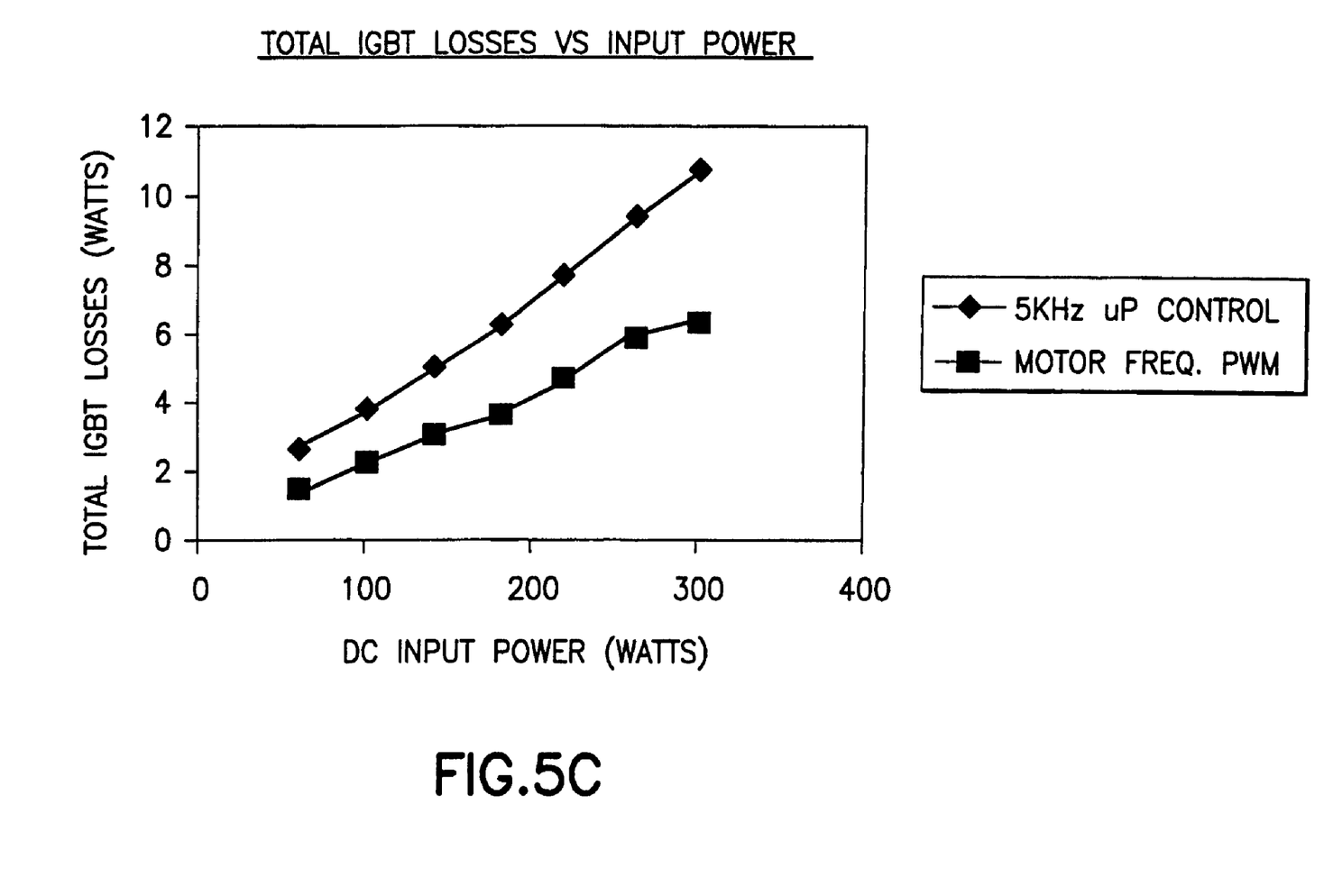
FIG. 5C is a graph comparing total IGBT losses versus input power for a 5 KHz microprocessor control of the prior art (FIG. 1) and motor frequency PWM according to present invention.

FIG. 5C illustrates the switching conduction loss differences between the reference circuit of FIG. 1 using a microprocessor to generate PWM output signals to control the IGBTs used in the third test, showing higher IGBT losses, and the motor frequency PWM circuit 20 of the present invention.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A variable speed brushless direct current (BLDC) motor drive circuit comprising:
   a plurality of high-side and low-side controlled switches coupled in a three-phase bridge configuration for commutating a BLDC motor having a motor frequency of operation, each phase of the bridge being connected to a corresponding phase of the motor;
   a controller for providing a drive signal to drive each of the high-side and low-side switches; and
   a speed control loop for controlling the motor by PWM of a DC bus voltage to achieve a constant motor speed, the speed control loop including:
   a pulse circuit receiving the drive signals provided from the controller for controlling the high-side switches and for providing a pulse signal that is related to a desired motor speed,
   a plurality of high-side drivers for driving the high-side switches, each high-side switch being coupled to a respective high-side driver, and
   a plurality of gating circuits each receiving the pulse signal from the pulse circuit and a drive signal for a respective high-side controller from the controller for generating a pulse width modulation (PWM) control signal at the motor frequency having a pulse duration determined by said pulse signal from said pulse circuit to thereby drive each of the high-side drivers to modulate their corresponding high-side switches.

2. The circuit of claim 1, wherein the switches are insulated gate bipolar transistors (IGBTs).

3. The circuit of claim 2, wherein the low-side IGBTs are N-Channel devices and the high-side IGBTs are P-Channel devices.

4. The circuit of claim 1, wherein the controller further provides initial rotor positioning and acceleration control for starting the motor.

5. The circuit of claim 4, wherein the signals are provided in response to detection of zero crossings of a back electromotive force (EMF) corresponding to outputs of each of the bridge phases corresponding to a non-energized motor winding.

6. The circuit of claim 5, wherein the controller further receives a plurality of signals from each phase of the three-phase bridge, the signals being used for the detection of zero crossings of the back EMF of a non-energized winding of the motor for providing commutation times.

7. The circuit of claim 6, wherein before the motor generates back EMF, starting ramp-up dfreq/dt of the controller is selected by an external capacitor.

8. The circuit of claim 5, wherein during a start-up period, when there is no generated back EMF, driver outputs are clocked by a frequency ramp-up until back EMF is established.

9. The circuit of claim 1, wherein the controller is an integrated circuit (IC).

10. The circuit of claim 9, wherein the IC is a three phase, 15-Volt, BLDC motor drive IC.

11. The circuit of claim 1, wherein operation of the pulse circuit is triggered by a leading edge of the signals from the controller to the high-side switches.

12. The circuit of claim 11, wherein the pulse circuit outputs the pulse signal at three times the motor frequency.

13. The circuit of claim 12, wherein a timing circuit of the pulse circuit is controlled by an external DC voltage and a timing capacitor.

14. The circuit of claim 1, wherein at each commutation of the motor the PVTM signal adjusts the time that a switch conducts current.

15. The circuit of claim 14, wherein the adjustment in the time of switch conduction adjusts a volt-seconds output which controls the motor speed.

16. The circuit of claim 14, wherein the volt-seconds adjustment is performed in an open loop system where the motor speed is controlled from an analog control voltage source.

17. The circuit of claim 14, wherein the volt-seconds adjustment is performed in a closed loop system where the motor speed is regulated against line and load variations.

18. The circuit of claim 1, wherein conduction losses of the switches are minimized and overall efficiency of the motor is maximized.

19. The circuit of claim 1, operating a refrigeration/air-conditioning compressor operating at a speed ratio of about 3:1 for a six step motor.

20. The circuit of claim 1, wherein the pulse circuit is a dual monostable multivibrator.

21. The circuit of claim 1, wherein the gating circuit comprises two input NOR gates.

22. A method of controlling a brushless direct current (BLDC) motor in a variable speed BLDC motor drive circuit having a motor frequency of operation using pulse width modulation (PWM) of a DC bus voltage to achieve a constant motor speed, the method comprising the following steps:

detecting zero crossings of a back electromotive force (EMF) corresponding to outputs of each phase corresponding to a non-energized winding of the motor;

providing a control signal for each of a plurality of high-side and low-side switches coupled in a three-phase bridge configuration for commutating the motor, the low-side switches receiving the signal directly; and for each high-side switch:

performing a gating operation on the signals and a pulse signal from a pulse circuit that receives the control signals to generate control PWM signals at the motor frequency for each high-side switch having a pulse duration determined by said pulse signal from said pulse circuit, and driving the high-side switch with the PWM signals, wherein at each commutation of the motor the generated control PWM signals adjust the time that the high-side switches conduct a current.

* * * * *